US009323540B2

(12) United States Patent
Fuks et al.

(10) Patent No.: US 9,323,540 B2
(45) Date of Patent: Apr. 26, 2016

(54) TASK EXECUTION DETERMINISM IMPROVEMENT FOR AN EVENT-DRIVEN PROCESSOR

(71) Applicant: NXP B.V., Eindhoven (NL)

(72) Inventors: Adam Fuks, Sunnyvale, CA (US); Sergio Scaglia, San Jose, CA (US)

(73) Assignee: NXP B.V., Eindhoven (NL)

( * ) Notice: Subject to any disclaimer, the term of this patent is extended or adjusted under 35 U.S.C. 154(b) by 91 days.

(21) Appl. No.: 13/968,374

(22) Filed: Aug. 15, 2013

(65) Prior Publication Data

US 2015/0052340 A1 Feb. 19, 2015

(51) Int. Cl.
*G06F 11/00* (2006.01)
*G06F 9/44* (2006.01)

(52) U.S. Cl.
CPC .................................. *G06F 9/4401* (2013.01)

(58) Field of Classification Search
CPC ......... H04M 3/30; H04M 3/24; H04M 3/248; G06F 11/1658; G06F 11/1679; G06F 11/1683; G06F 11/1641; G06F 11/1961
See application file for complete search history.

(56) References Cited

U.S. PATENT DOCUMENTS

| | | | |
|---|---|---|---|
| 5,175,844 A | 12/1992 | Fukuda | |
| 5,367,699 A | 11/1994 | Lange et al. | |
| 5,463,744 A | 10/1995 | Kundu et al. | |
| 5,911,083 A | 6/1999 | Kuslak | |
| 6,332,180 B1 * | 12/2001 | Kauffman | G06F 9/5077 711/153 |
| 6,728,781 B1 * | 4/2004 | Aguilera et al. | 709/240 |
| 7,350,117 B2 * | 3/2008 | Garcia | 714/55 |
| 7,630,313 B2 * | 12/2009 | Batni | H04L 12/24 370/235 |
| 8,065,279 B2 * | 11/2011 | Errickson et al. | 707/687 |
| 8,301,937 B2 * | 10/2012 | Joy et al. | 714/38.12 |
| 8,327,125 B2 * | 12/2012 | Zhang | G06F 21/575 713/1 |
| 8,489,923 B1 * | 7/2013 | Lakshminarayanan | H04N 21/2662 709/203 |
| 9,100,288 B1 * | 8/2015 | Ganjam | H04L 43/06 |
| 2004/0030819 A1 * | 2/2004 | Williams | 710/260 |
| 2004/0034816 A1 * | 2/2004 | Richard | 714/39 |
| 2006/0067227 A1 * | 3/2006 | Batni | H04L 12/24 370/235 |
| 2006/0075061 A1 * | 4/2006 | Garcia | 709/213 |
| 2011/0119475 A1 | 5/2011 | Chen et al. | |
| 2011/0126215 A1 | 5/2011 | Fuks et al. | |
| 2011/0283028 A1 * | 11/2011 | Byers | G06F 13/4022 710/107 |
| 2012/0246339 A1 * | 9/2012 | Huang et al. | 709/239 |
| 2014/0143580 A1 * | 5/2014 | Vahidsafa | 713/400 |

OTHER PUBLICATIONS

Adaptive Method and Adaptive Device of Heartbeat CycleDec. 26, 2012 China.*

* cited by examiner

*Primary Examiner* — Amine Riad

(57) ABSTRACT

Embodiments of a method for operating an event-driven processor and an event-driven processor are described. In one embodiment, a method for operating an event-driven processor involves configuring a heartbeat timer of the event-driven processor and handling an event using the event-driven processor based on the heartbeat timer. Using a heartbeat timer built into the event-driven processor, the task execution determinism of the event-driven processor is improved and the power consumption of the event-driven processor is reduced. Other embodiments are also described.

17 Claims, 3 Drawing Sheets

TASK EXECUTION DETERMINISM IMPROVEMENT FOR AN EVENT-DRIVEN PROCESSOR

For a processor, characteristics such as service bandwidth for communication with a peripheral and determinism for task execution are important for the performance. For example, in a complex multi-central processing unit (CPU) or multi-peripheral system-on-chip (SoC), service bandwidth for communication between a CPU or SoC and a peripheral is generally unpredictable and determinism for task execution can be difficult. In order to ensure some measure of determinism, software typically partitions a task into smaller units for which the start of execution can be synched up using an interrupt. Nonetheless, using an interrupt to re-synchronize task execution increases overhead in terms of execution. For example, every time an instruction execution is diverted from the main thread to the interrupt thread, several cycles are spent in order for the CPU to perform context switching, such as, stacking of registers. In addition, the granularity achievable by re-synchronizing task execution using an interrupt is relatively limited. If software is explicitly written to stall execution after every one or more instruction, the code size of the software will increase. Furthermore, repeated execution of the wait-for-interrupt instructions can increase the code size and waste computational resources.

Power consumption of a processor is an important performance metric. Some CPU tasks are subject to unpredictable accessing latencies. During the execution of those tasks, the CPU likely wastes power during idle cycles. For example, the CPU's internal circuitry may be running and consuming power, but no progress is possible due to an external latency.

Embodiments of a method for operating an event-driven processor and an event-driven processor are described. In one embodiment, a method for operating an event-driven processor involves configuring a heartbeat timer of the event-driven processor and handling an event using the event-driven processor based on the heartbeat timer. Using a heartbeat timer built into the event-driven processor, the task execution determinism of the event-driven processor is improved and the power consumption of the event-driven processor is reduced. Other embodiments are also described.

In an embodiment, a method for operating an event-driven processor involves configuring a heartbeat timer of the event-driven processor and handling an event using the event-driven processor based on the heartbeat timer.

In an embodiment, an event-driven processor includes an instruction store configured to store an instruction set that includes computer executable instructions to implement a heartbeat timer within the event-driven processor. The event-driven processor also includes an operation code interpreter to configure the heartbeat timer and to handle an event based on the heartbeat timer.

In an embodiment, a method for operating an event-driven processor involves configuring a heartbeat timer that is integrated into an instruction set of the event-driven processor. Configuring the heartbeat timer includes specifying a heartbeat period for the event-driven processor and counting down the heartbeat timer to a predefined value until the heartbeat period expires. The method also involves executing a software routine using the event-driven processor in response to an event when the heartbeat timer reaches the predefined value, where the software routine includes a machine language instruction that specifies an operation to be performed by the event-driven processor.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
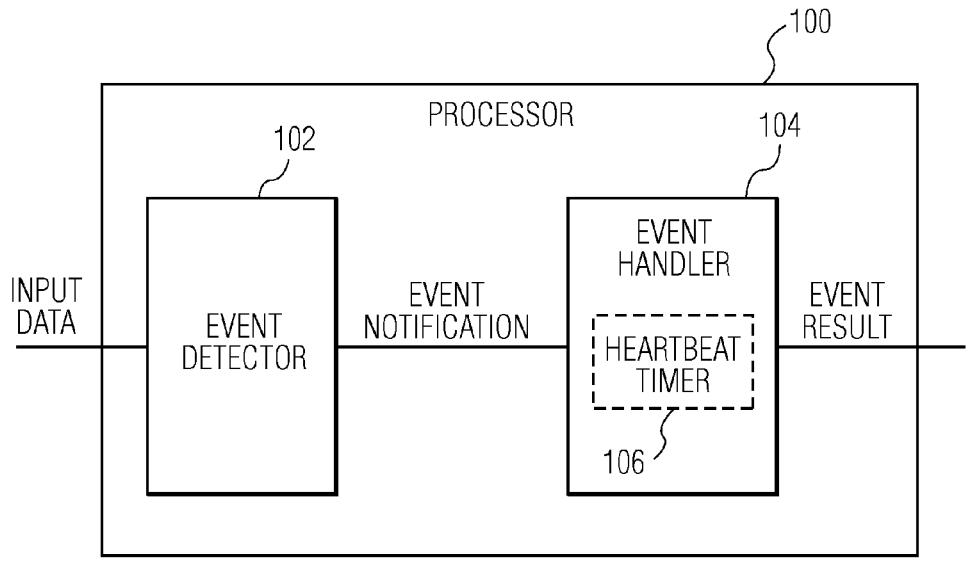
FIG. 1 is a schematic block diagram of a processor in accordance with an embodiment of the invention.

FIG. 1 is a schematic block diagram of a processor 100 in accordance with an embodiment of the invention. The processor 100 allows a controllable slow down of the execution of a task, as well as ensures to a large extent deterministic task execution, as described in details below. In the embodiment depicted in FIG. 1, the processor 100 is an event-driven processor that includes an event detector 102 that checks for the occurrence of an event based on input data and an event handler 104 that handles the event in response to an event notification from the event detector. An "event" is a predefined occurrence. Examples of events may include, but are not limited to, user actions (e.g., keyboard actions, mouse actions), completion of an internal I/O function, timed hardware events, and arrival of data from another computer. The event-driven processor can overlap the execution of computation functions with the execution of input/output (I/O) functions. An event-based software program enables the event-driven processor to run multiple tasks using a computation structure that features a main control loop ("main loop") that allows a callback function when an event occurs outside the program of the main loop. In some embodiments, an event-driven program uses a library of events that contains an association table correlating specific events with specific callback functions. The callback functions may be machine instructions directing the event-driven processor to take specific actions. Examples of processor actions may include, but are not limited to, executing predefined computation functions, transmitting notifications, and database queries. A callback function is associated with a corresponding event type. The event-driven processor can execute a sequence of callback functions in response to one or more successive events.

In some embodiments, the event-driven processor 100 is a microcontroller that is designed for one or more specific, dedicated applications. For example, the event-driven processor can execute machine instructions as directed by callback functions that are specified by triggering events. In addition to the event detector 102 and the event handler 104, the event-driven processor may also contain other components, such as timers, serial or parallel I/O interfaces, and program memory. However, in some other embodiments, the event-driven processor is a general purpose processor, such as a CPU.

Conventional interrupt-driven processors cannot stop processing while waiting for an event to occur. Instead, conventional interrupt-driven processors constantly execute instructions, which is not only time consuming but also drains system resources. For some events like I/O operations from infrequently-used peripherals, such as, for example, faxes, scanners, and printers, persistent monitoring results in a great waste of energy and system resources.

In the embodiment depicted in FIG. 1, the event-driven processor 100 is a non Interrupt-driven processor. Compared to conventional interrupt-driven processors, the event-driven processor 100 depicted in FIG. 1 allows a controllable slow down of the execution of a task, as well as ensures to a large extent deterministic task execution. In an embodiment, the event-driven processor has its own "heartbeat" timer such that either each instruction can be executed after a certain delay or whole blocks of code can be aligned to start at deterministic points in time. Compared to a conventional interrupt-driven processor, the event-driven processor can be implemented with a limited code size increase. Using the event-driven processor, instructions can be fetched at full speed but execution of the operation code (opcode) is stalled until a heartbeat is generated (i.e., a heartbeat timer reaches a predefined threshold value such as zero). An opcode may be a machine language instruction that specifies the operation to be performed. Synchronizing the execution with a heartbeat timer gives a user a powerful tool to create a "snap-to-grid" style (i.e., deterministic as in a grid) execution where even though the event-driven processor may experience various latencies, it is still possible to ensure predictable deterministic execution. As long as the next instruction is fetched during the duration of a heartbeat counter/timer countdown, software instructions can be executed on time. In other words, regardless what kind of latency each instruction fetch or data read/write experiences, as long as the instruction is fetched before the heartbeat counter reaches zero, a deterministic execution can be achieved. Setting the event-driven processor to synchronize all its opcodes to given heartbeat intervals allows the event-driven processor to dynamically change its execution speed without affecting the connection with a peripheral. Consequently, the event-driven processor can easily switch from executing at one pace to executing at another (i.e., slower or quicker) pace by increasing or decreasing the heartbeat interval. Because the event-driven processor can change execution speed, the event-driven processor can be agile in terms of execution speed when necessary and slower and more deterministic at other times. In addition, the event-driven processor can shut down the processing functionality in between heartbeat intervals to reduce the power consumption from task execution. For example, the event-driven processor can save power when the length of time taken to execute a task is not finite and when faster execution does not reduce the task execution duration.

In the embodiment depicted in FIG. 1, a heartbeat timer 106 is implemented inside the event-driven processor 100. For example, the heartbeat timer can be implemented in the event handler 104. The heartbeat timer can be implemented in hardware and/or software stored in a computer readable storage medium. In some embodiments, the event handler configures the heartbeat timer and handles an event based on the heartbeat timer. In an embodiment, the event handler specifies a heartbeat period for the event-driven processor, fetches a software routine before the heartbeat period expires, and executes the software routine in response to one or more events detected by the event detector 102 after the heartbeat period expires. A heartbeat period for the event-driven processor is the time period of one cycle of the heartbeat timer 106. For example, in one cycle of the heartbeat timer 106, the heartbeat timer 106 is counted a predetermined number (i.e., an integer) of counts. The event handler can also specify a different heartbeat period for the event-driven processor after the heartbeat period expires. In an embodiment, the event handler counts down a heartbeat timer to a predefined value (e.g., zero) and executes the software routine when the heartbeat timer reaches the predefined value. The event handler can also specify a heartbeat interval for the event-driven processor and repetitively execute software routines in response to one or more detected events at the heartbeat interval.

In some embodiments, the heartbeat timer 106 is implemented in an instruction set of the event-driven processor 100. The instruction set includes computer executable instructions (i.e., software code) that are used to implement the computing functions of the event-driven processor 100. For example, the instruction set can include software code for data handling and memory operations, such as setting a register to a value and moving data between memory locations. The instruction set can also include software code for arithmetic and logic operations. For example, the instruction set can include software code for adding, subtracting, multiplying, or dividing numeric values, and/or software code for performing bitwise operations. The heartbeat timer can be programmed to any value (e.g., any non-negative integer). For example, the heartbeat timer can repetitively count down to zero. When zero is reached, a corresponding software routine is executed. Generally, no processor system message is generated or emitted when the heartbeat timer counts to zero. The event-driven processor can be programmed to either synchronize all opcode execution to a heartbeat interval or to execute a stall of execution until the next heartbeat interval. Synchronizing all opcodes to the heartbeat timer allows for completely deterministic task execution even if there is bus contention between the event-driven processor and another entity on the bus. Consequently, the heartbeat timer gives the event-driven processor both the ability to time its own operation and the ability to reduce its power profile on the fly without affecting system performance and external clock frequency. Because the event-driven processor can operate at full speed or throttle the execution part of the pipeline, the event-driven processor can perform snap-to-grid execution. In addition, because the heartbeat timer can be implemented within the instruction set of the processor 100, the event-driven processor can operate as a peripheral.

Figure 2:
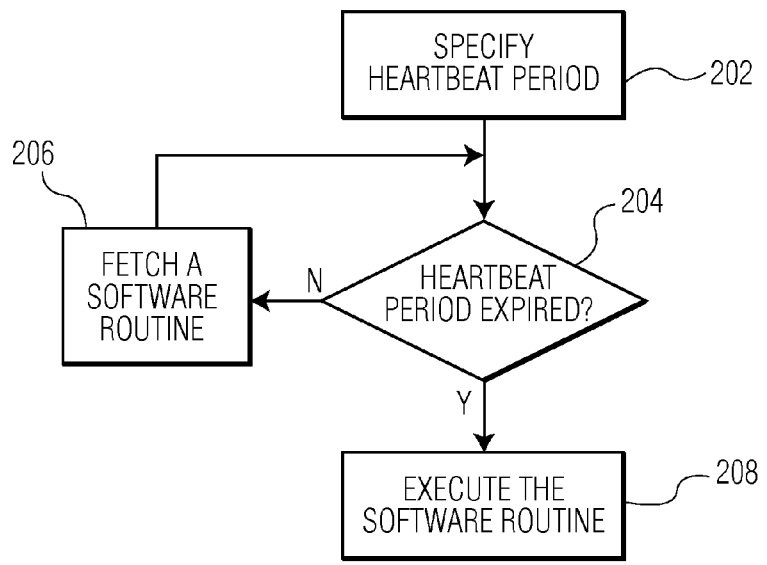
FIGS. 2 and 3 are flow charts that illustrate two exemplary operations of the processor depicted in FIG. 1.
Figure 3:
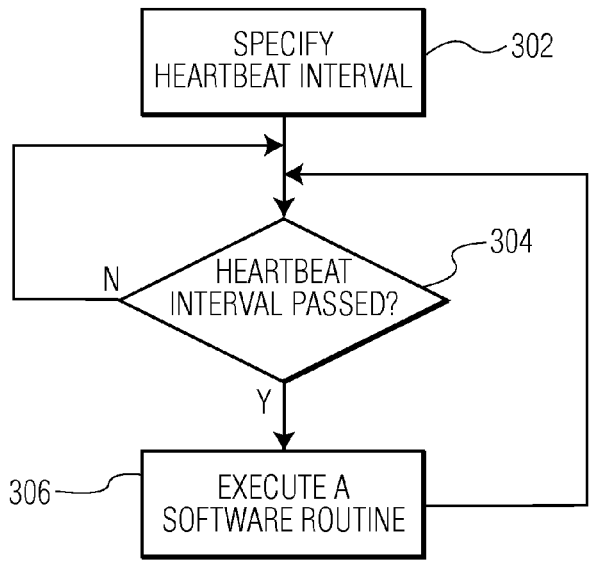

FIGS. 2 and 3 are flow charts that illustrate two exemplary operations of the processor 100 depicted in FIG. 1. In some embodiments, the heartbeat timer 106 is counted to a predefined threshold value (e.g., zero) based on a heartbeat period. In the operation depicted in FIG. 2, a heartbeat period of the heartbeat timer 106 is specified at step 202. At step 204, the processor checks whether or not the heartbeat period has expired. If the heartbeat period has not expired, the processor fetches a software routine at step 206. If the heartbeat period has expired, the processor executes the fetched software routine at step 208. Because the event-driven processor 100 synchronizes the execution of a software routine with a heartbeat period, the task execution determinism of the event-driven processor is enhanced. In addition, because software code can be pre-fetched into the event-driven processor while the event-driven processor waits for the heartbeat period to expire, the operation efficiency of the event-driven processor is improved.

In some embodiments, the heartbeat timer 106 is periodically counted to a predefined threshold value (e.g., zero) based on a heartbeat interval that defines the time between two consecutive heartbeats. In the operation depicted in FIG. 3, a heartbeat interval of the heartbeat timer 106 is specified at step 202. At step 304, the processor 100 checks whether or not one or more heartbeat intervals have passed from the time point at which the heartbeat interval is specified. If one or more heartbeat intervals have passed, the processor executes a software routine at step 306. If one or more heartbeat intervals have not passed, the processor goes back to step 304 and rechecks whether or not one or more heartbeat intervals have passed. The processor can pre-fetch the software routine between heartbeat intervals. Because the event-driven processor 100 synchronizes the execution of software routines with heartbeat intervals, the task execution determinism of the event-driven processor is enhanced.

Figure 4:
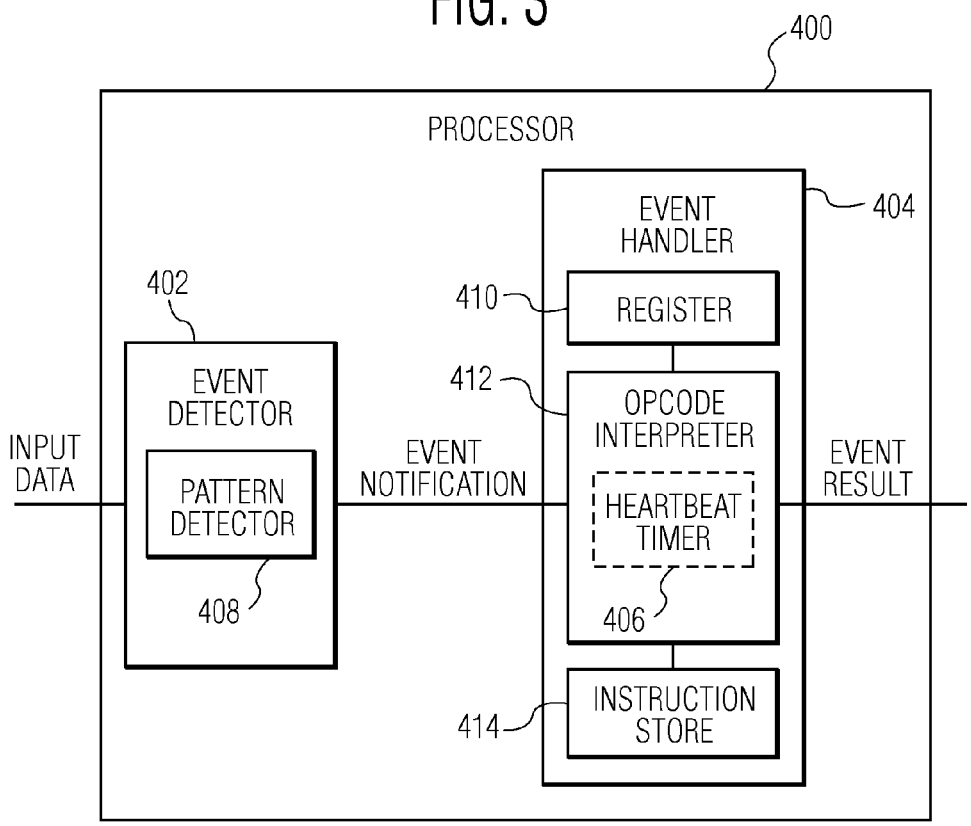
FIG. 4 depicts an embodiment of the processor depicted in FIG. 1.

FIG. 4 depicts an embodiment of the event-driven processor 100 depicted in FIG. 1 that includes a heartbeat timer 206 implemented in the instruction set of an event-driven processor 400. In the embodiment depicted in FIG. 4, the event-driven processor 400 includes an event detector 402 that checks for the occurrence of an event based on input data and an event handler 404 that handles the event in response to an event notification from the event detector. The event-driven processor 400 depicted in FIG. 4 is one of the possible implementations of the event-driven processor 100 depicted in FIG. 1. However, the event-driven processor 100 depicted in FIG. 4 is not limited to the event-driven processor 400 depicted in FIG. 2.

The event detector 402 of the event-driven processor 400 includes a pattern detector 408 that is configured to monitor at least one event from a series of external inputs. The pattern detector may monitor multiple events simultaneously. The pattern detector may monitor for a combination of events to occur and provide a positive logical bit when a combination of events is true. A user may configure the pattern detector to monitor for a Boolean event source combination. The output of the pattern detector may be a logic bit, such as a "1" or "0." In an embodiment, the pattern detector uses a number of software bit slices to monitor external inputs for at least one triggering event to occur. Each bit slice monitors a single external input for a triggering event.

The event handler 404 of the event-driven processor 400 includes an opcode interpreter 412, an instruction store 414, and at least one register 410. The opcode interpreter retrieves and executes at least one instruction. The instruction store maintains a list of instructions for the microprocessor to retrieve and register stores opcodes that enable various functions of the event-driven processor. In the embodiment depicted in FIG. 4, the instruction store stores the instruction set into which the heartbeat timer of the event-driven processor is built. The register may be implemented in a memory component, such as a flash, RAM, or ROM memory.

In some embodiments, the opcode interpreter 412 fetches, decodes, and executes the opcodes from machine instructions retrieved from, for example, the instruction store 414. In an embodiment, the opcode interpreter executes a series of machine instructions stored in the instruction store. Some machine instructions may alter the state of a state machine in the opcode interpreter. The execution of a specific instruction or subroutine of instructions in the opcode interpreter may be triggered by the output of the pattern detector 208. In some embodiments, the opcode interpreter may include a state machine that maintains multiple states and may change state based on the execution of specific instructions. In an embodiment, the opcode interpreter operates using four fundamental processing steps utilizing machine instructions: fetch, decode, execute, and writeback.

An example of the operation of the opcode interpreter 412 is described as follows. In a fetching step, the opcode interpreter retrieves a machine instruction stored in an instruction memory, such as the instruction store 414. The retrieved instruction may include an operation code (opcode) that specifies to the opcode interpreter which operation to perform and, may also provide one or more operands or other parameters for the instructed operation. The storage of instructions for the opcode interpreter may be the instruction store, another memory device within the event-driven processor 400, or an instruction cache memory off of the event-driven processor. The opcode interpreter may then follow its fetch instruction to decode the fetched instruction.

A traditional interrupt-driven processor typically replies on an external timer as an interrupt source, which not only introduces latency but also causes jitter. For example, an interrupt-driven processor usually performs the stacking of its internal registers before entering the Interrupt Service Routine (ISR). In addition, the reconfiguring of the timer may also introduce further jitter. Compared to a traditional interrupt-driven processor, the event-driven processor 400 has less jitter. In particular, the event-driven processor 400 has a built-in heartbeat timer 406 that is implemented in the instruction set of the event-driven processor. For example, the heartbeat timer 406 can be applied by software code of the instruction set.

The integration of the heartbeat timer 406 into the instruction set of the event-driven processor 400 allows a programmer to realize functions that are generally unattainable for traditional processors. For example, an interval can be timed by configuring the heartbeat timer (e.g., by executing a heartbeat configuration "HEART_BEAT_CONFIG" routine/procedure) and then waiting for the heartbeat timer to reach a predefined threshold value (e.g., by executing a waiting for heartbeat "WAIT_FOR_BEAT" routine) through the opcode interpreter 412. This approach can be used to guarantee that the following opcode executes at exactly the time interval specified from the point at which the heartbeat configuration opcode has executed. In addition, instructions can be repetitively executed at regular heartbeat intervals. For example, the waiting for heartbeat routine can be used whenever the code needs to stall to wait for the next beat. Further, the heartbeat timer can be configured through a single opcode to force execution of each opcode only when the heartbeat timer reaches the predefined threshold value.

Figure 5:
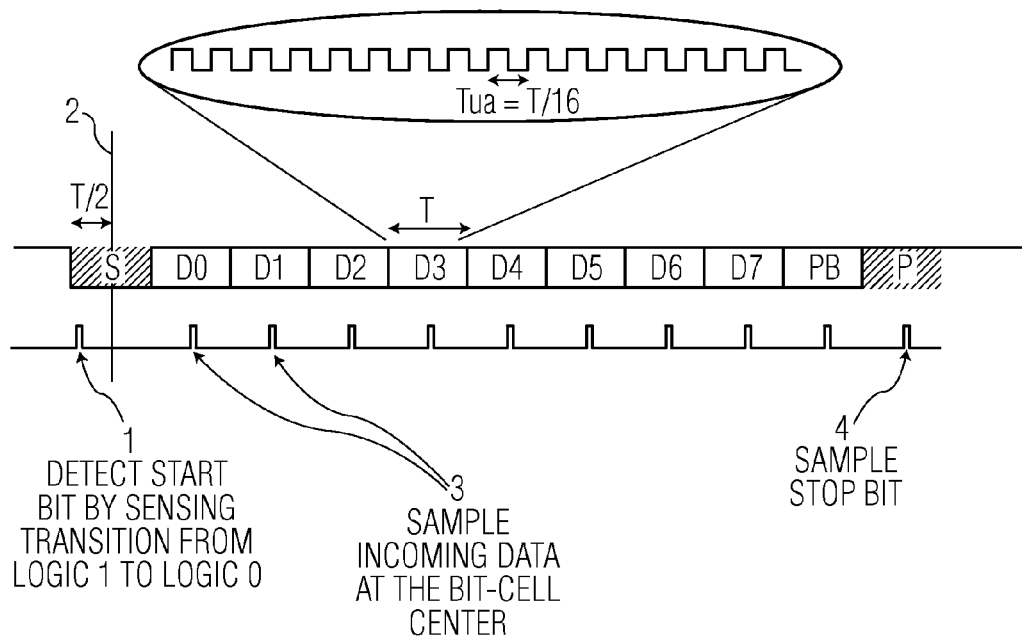
FIG. 5 illustrates an embodiment of an operation of the processor depicted in FIG. 4.

The internal heartbeat timer 406 can be used to achieve concatenated delay. For example, a waiting for heartbeat routine can be followed up with a heartbeat configuration instruction to guarantee that a new heartbeat cycle starts immediately at the point the previous heartbeat cycle stop. A pseudo code example that uses the heartbeat timer to achieve concatenated delay is described as follows with reference to a data sampling operation as shown in FIG. 5. The code example can be used for the event-driven processor 400 (e.g., the opcode interpreter 412) to execute the functions of a Universal Asynchronous Receiver/Transmitter (UART). In the case of the UART, the first wait time is for half a bit-time (T/2), the following wait is for a complete bit-time (T) to allow sampling in the middle of each bit. A bit time (T) is a bit period, which is equal to the inverse of the Baud rate of the UART. The UART can oversamples each bit n (n is a positive integer that is larger than one) times and each bit time (T) is equal to n time of an oversample period "Tua." In the embodiment depicted in FIG. 5, the UART oversamples each bit 16 times and each bit time (T) is equal to 16 times of an oversample period "Tua."

"HEART_BEAT_CONFIG" routine and is checked to make sure that the data is not a glitch. If the data is a glitch, the program goes back to the "WAIT_LOOP." If the data is not a glitch, the data is processed through a loop procedure "LOOP," for example, eight or nine times depending on the parity bit "PB". In the "LOOP," a "WAIT_FOR_BEAT" routine is executed after the heartbeat synchronization time (T) expires from the moment the "HEART_BEAT_CONFIG" routine is executed, as shown at data sample point ③ of FIG. 5. Subsequently, in the "LOOP," a processing procedure "LOAD_AND_ACCUMULATE_DATA" is executed to read and accumulate data and a conclusion procedure "SHIFT_ACC_RIGHT_1" is execute to prepare for next data bit. After the loop procedure "LOOP," is executed, a "WAIT_FOR_BEAT" routine is executed after the heartbeat synchronization time (T) expires, as shown at data sample point ④ of FIG. 5. Subsequently, if the stop bit "P" of the data is verified, the processed data is deemed as valid and read into a database. If the stop bit of the data is not verified, the processed data is discarded and the program goes to the "WAIT_LOOP".

Figure 6:
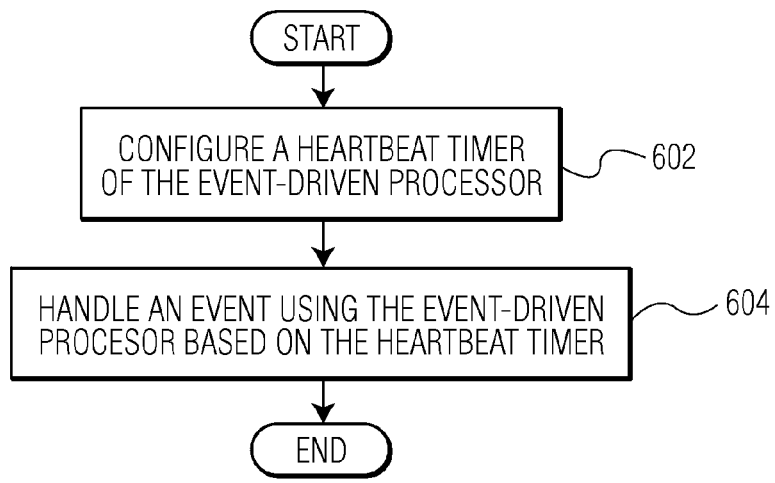
FIG. 6 is a process flow diagram of a method for operating an event-driven processor in accordance with an embodiment of the invention.

FIG. 6 is a process flow diagram that illustrates a method for operating an event-driven processor in accordance with an embodiment of the invention. The event-driven processor may be the event-driven processor 100 depicted in FIG. 1 or the event-driven processor 400 depicted in FIG. 4. At block 602, a heartbeat timer of the event-driven processor is configured. At block 604, an event is handled using the event-driven processor based on the heartbeat timer.

Although the operations of the method herein are shown and described in a particular order, the order of the operations of the method may be altered so that certain operations may be performed in an inverse order or so that certain operations

```
PSEUDO-CODE:
    WAIT_LOOP
        HEART_BEAT_CONFIG(T/2)              // configure for T/2
        WAIT_FOR_TRIGGER         ①          // detect Start bit
        WAIT_FOR_BEAT            ②// Sync. with bit-cell center (for Start bit)
        HEART_BEAT_CONFIG(T)                 // from now on, need to sync every T
time. Configure for T
        LOAD_DATA                            // Read the data
        IF DATA = 1 GOTO WAIT_LOOP           // need to be sure it's a Start
bit (and not a glitch)
        LOOP (8 times)                       // loop 8 (or 9 if parity) times
to go through the Data
            WAIT_FOR_BEAT        ③ // Sync, with bit-cell center (for Data bits)
            LOAD_AND_ACCUMULATE_DATA         // Read and
Accumulate Data
            SHIFT_ACC_RIGHT_1                // prepare for next Data bit
        END LOOP
        WAIT_FOR_BEAT            ④// Sync. with bit-cell center (for Stop bit)
        IF DATA = 0 GOTO WAIT_LOOP           // need to verify Stop bit;
otherwise discard the reception
        DATA_READ_IS_VALID                   // end: Data is read and valid
```

The code example starts with a loop "WAIT_LOOP" that contains a "HEART_BEAT_CONFIG" routine that specifies the heartbeat synchronization time (i.e., the wait time) for half a bit-time (T/2). Subsequently, as shown at data sample point ① of FIG. 5, a "WAIT_FOR_TRIGGER" routine is used to detect the start bit "S" by sensing transition from logic "1" to logic "0." A "WAIT_FOR_BEAT" routine is executed after the heartbeat synchronization time (T/2) expires from the moment the "HEART_BEAT_CONFIG" routine is executed, as shown at data sample point ② of FIG. 5. Subsequently, a "HEART_BEAT_CONFIG" routine that specifies the heartbeat synchronization time for one bit-time (T) is executed. Data "$D_0$"-"$D_7$" is loaded after the execution of the may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for operating an event-driven processor, the method comprising:
   configuring a heartbeat timer of the event-driven processor, wherein configuring the heartbeat timer of the event-driven processor comprises specifying a first heartbeat period for the event-driven processor;
   handling an event using the event-driven processor based on the heartbeat timer; and
   specifying a second heartbeat period for the event-driven processor after the first heartbeat period expires, wherein the second heartbeat period is longer than the first heartbeat period, and wherein the second heartbeat period is twice the first heartbeat period.

2. The method of claim 1, wherein the heartbeat timer is integrated into an instruction set of the event-driven processor.

3. The method of claim 1, wherein handling the event using the event-driven processor comprises executing a software routine using the event-driven processor in response to the event after the first heartbeat period expires.

4. The method of claim 3, wherein handling the event using the event-driven processor comprises fetching the software routine into the event-driven processor before the first heartbeat period expires.

5. The method of claim 3, wherein the software routine comprises a machine language instruction that specifies an operation to be performed by the event-driven processor.

6. The method of claim 1, wherein configuring the heartbeat timer of the event-driven processor further comprises counting down the heartbeat timer to a predefined value until the first heartbeat period expires.

7. The method of claim 6, wherein handling the event using the event-driven processor comprises executing a software routine in response to the event when the heartbeat timer is counted down to the predefined value.

8. The method of claim 1, wherein configuring the heartbeat timer of the event-driven processor comprises specifying a heartbeat interval for the event-driven processor.

9. The method of claim 8, wherein handling the event using the event-driven processor comprises repetitively executing software routines using the event-driven processor in response to the event at the heartbeat interval.

10. The method of claim 1, wherein the first heartbeat period is half a bit-time (T/2), and wherein the second heartbeat period is a complete bit-time (T).

11. An event-driven processor comprising:
    an instruction store configured to store an instruction set, wherein the instruction set comprises computer executable instructions to implement a heartbeat timer within the event-driven processor; and
    an operation code interpreter to configure the heartbeat timer and to handle an event based on the heartbeat timer, wherein the operation code interpreter is configured to specify a first heartbeat period for the event-driven processor and to specify a second heartbeat period for the event-driven processor after the first heartbeat period expires, wherein the second heartbeat period is longer than the first heartbeat period, and wherein the second heartbeat period is twice the first heartbeat period.

12. The event-driven processor of claim 11, wherein the operation code interpreter is configured to:
    fetch a software routine before the first heartbeat period expires; and
    execute the software routine in response to the event after the first heartbeat period expires.

13. The event-driven processor of claim 12, wherein the software routine comprises a machine language instruction that specifies an operation to be performed by the operation code interpreter.

14. The event-driven processor of claim 12, wherein the operation code interpreter is configured to:
    count down the heartbeat timer to a predefined value until the first heartbeat period expires; and
    execute the software routine when the heartbeat timer reaches the predefined value.

15. The event-driven processor of claim 11, wherein the operation code interpreter is configured to:
    specify a heartbeat interval for the event-driven processor; and
    repetitively execute software routines in response to the event at the heartbeat interval.

16. A method for operating an event-driven processor, the method comprising:
    configuring a heartbeat timer that is integrated into an instruction set of the event-driven processor, wherein configuring the heartbeat timer comprises:
       specifying a first heartbeat period for the event-driven processor; and
       counting down the heartbeat timer to a predefined value at which point the first heartbeat period expires; and
    executing a software routine using the event-driven processor in response to an event when the heartbeat timer reaches the predefined value, wherein the software routine comprises a machine language instruction that specifies an operation to be performed by the event-driven processor; and
    specifying a second heartbeat period for the event-driven processor after the first heartbeat period expires, wherein the second heartbeat period is longer than the first heartbeat period, and wherein the second heartbeat period is twice the first heartbeat period.

17. The method of claim 16, further comprising fetching the software routine into the event-driven processor before the first heartbeat period expires.

* * * * *